US008781231B1

(12) United States Patent
Kumar et al.

(10) Patent No.: US 8,781,231 B1
(45) Date of Patent: Jul. 15, 2014

(54) CONTENT-BASED IMAGE RANKING

(75) Inventors: Sanjiv Kumar, Brooklyn, NY (US);
Henry A. Rowley, Sunnyvale, CA (US);
Ameesh Makadia, New York, NY (US)

(73) Assignee: Google Inc., Mountain View, CA (US)

( * ) Notice: Subject to any disclaimer, the term of this patent is extended or adjusted under 35 U.S.C. 154(b) by 945 days.

(21) Appl. No.: 12/547,303

(22) Filed: Aug. 25, 2009

(51) Int. Cl.
*G06K 9/54* (2006.01)
(52) U.S. Cl.
USPC ........... 382/190; 382/159; 382/172; 382/228; 705/14.52; 707/999.006
(58) Field of Classification Search
USPC ................. 382/190, 155–161, 168, 170, 171; 705/14.52, 14.54; 707/999.006, 707/999.007
See application file for complete search history.

(56) References Cited

U.S. PATENT DOCUMENTS

| 8,422,832 | B2 | 4/2013 | Makadia et al. |
| 2002/0188602 | A1 | 12/2002 | Stubler et al. |
| 2007/0271226 | A1 | 11/2007 | Zhang et al. |
| 2007/0296993 | A1 | 12/2007 | Bai |
| 2008/0021928 | A1 | 1/2008 | Yagnik |

FOREIGN PATENT DOCUMENTS

| EP | 1 696 353 | 8/2006 |
| JP | 2007-207031 | 8/2007 |
| KR | 10-2007-0115194 | 12/2007 |
| WO | 2007-136861 | 11/2007 |

OTHER PUBLICATIONS

Yushi Jing et al., "PageRank for Product Image Search", WWW 2008 / Refereed Track: Rich Media, Apr. 21-25, 2008, Beijing, China, pp. 307-315.
Ameesh Makadia et al., "A New Baseline for Image Annotation", 2008, 14 pages.
Hilal Zitouni et al., "Re-ranking Image Results using a Graph Algorithm", Apr. 20-22, 2008, 4 pages.
International Search Report for PCT/US2009/040975, dated Feb. 5, 2010, 4 pages.
European Search Report for EP 09767173.9, dated Oct. 9, 2012, 3 pages.
Barnard, K. and Johnson, M., "Word Sense Disambiguation with Pictures," Artificial Intelligence 167:13-30 (2005).
Blei, D., et al., "Modeling Annotated Data," In: Proc. ACM SIGIR 127-134 (2003).
Blei, D., et al., "Latent Dirichlet Allocation," Journal of Machine Learning Research 3:993-1022 (2003).
Carneiro, G. and Vasconcelos, N., "A Database Centric View of Semantic Image Annotation and Retrieval," In: SIGIR 559-566 (2005a).

(Continued)

*Primary Examiner* — Kim Vu
*Assistant Examiner* — Michael Vanchy, Jr.
(74) *Attorney, Agent, or Firm* — Fish & Richardson P.C.

(57) ABSTRACT

Methods, systems, and apparatus, including computer program products, for ranking search results for queries. The method includes calculating a visual similarity score for one or more pairs of images in a plurality of images based on visual features of images in each of the one or more pairs; building a graph of images by linking each of one or more images in the plurality of images to one or more nearest neighbor images based on the visual similarity scores; associating a respective score with each of one or more images in the graph based on data indicative of user behavior relative to the image as a search result for a query; and determining a new score for each of one or more images in the graph based on the respective score of the image, and the respective scores of one or more nearest neighbors to the image.

23 Claims, 6 Drawing Sheets

(56) References Cited

OTHER PUBLICATIONS

Carneiro, G. and Vasconcelos, N., "Formulating Semantic Image Annotation as a Supervised Learning Problem." In: *IEEE CVPR*, 559-566 (2005b).

Carneiro, G., et al., "Supervised Learning of Semantic Classes for Image Annotation and Retrieval," *IEEE Transactions on Pattern Analysis and Machine Intelligence* 29(3):394-410 (2007).

Datta, R., et al., "Image Retrieval: Ideas, Influences, and Trends of the New Age," *ACM Computing Surveys* 40(2):1-60 (2008).

Duygulu, P., et al., "Object Recognition as Machine Translation: Learning a Lexicon for a Fixed Image Vocabulary," In: *Proceedings of the $7^{th}$ European Conference on Computer Vision* 2353:97-112 (2002).

Feng, S. L., et al., "Multiple Bernoulli Relevance Models for Image and Video Annotation," In: *IEEE Conf. Computer Vision and Pattern Recognition* (2004).

Frome, A., et al., "Learning Globally-Consistent Local Distance Functions for Shape-Based Image Retrieval and Classification," In: *Proceedings of the IEEE International Conference on Computer Vision*, Rio de Janeiro, Brazil (2007).

Gao, Y. and Fan, J., "Incorporating Concept Ontology to Enable Probabilistic Concept Reasoning for Multi-Level Image Annotation," In: *Proceedings of the $8^{th}$ ACM international workshop on Multimedia information retrieval*, 79-88 (2006).

Hare, J. S., et al., "Mind the Gap: Another Look at the Problem of the Semantic Gap in Image Retrieval," *Multimedia Content, Analysis, Management and Retrieval*, 6073:607309-1-607309-12 (2006).

Howarth, P. and Rüger, S., "Fractional Distance Measures for Content-Based Image Retrieval," Lecture Notes in Computer Science: *Advances in Information Retrieval* 3408:447-456 (2005).

Howarth, P. and Ruger, S., "Robust Texture Features for Still-Image Retrieval," *Vision, Image and Signal Processing, IEE Proceedings* 152:6 868-874 (2005).

Jeon, J., et al., "Automatic Image Annotation and Retrieval using Cross-Media Relevance Models," In: *Proc. ACM SIGIR Conf. Research and Development in Information Retrieval*, New York, NY, USA, 119-126 (2003).

Jin, R., et al., "Effective Automatic Image Annotation via a Coherent Language Model and Active Learning," In: *Proc. ACM Multimedia Conference*, 892-899 (2004).

Edited by Thrun, S., et al., *Advances in Neural Information Processing Systems 16: Proceedings of the 2003 Conference*. Cambridge, MA: The MIT Press: A Bradford Book (2004).

Lavrenko, V., et al., "A Model for Learning the Semantics of Pictures," In: *Advances in Neural Information Processing Systems* 16, 553-560 (2004).

Li, J. and Wang, J. Z., "Automatic Linguistic Indexing of Pictures by a Statistical Modeling Approach," *IEEE Transactions on Pattern Analysis and Machine Intelligence* 25:9 1075-1088 (2003).

Li, J. and Wang, J. Z., "Real-Time Computerized Annotation of Pictures," *Proc. ACM Multimedia* 911-920 (2006).

Metzler, D. and Manmatha, R., "An Inference Network Approach to Image Retrieval," *Image and Video Retrieval* 3115:42-50 (2004).

Monay, F., and Gatica-Perez, D., "On Image Auto-Annotation with Latent Space Models," In: *Proc. ACM Int'l Conf. Multimedia*, 275-278 (2003).

Mori, Y., et al., "Image-to-Word Transformation Based on Dividing and Vector Quantizing Images with Words," In: *Proceedings of the First International Workshop on Multimedia Intelligent Storage and Retrieval Management (MISRM)*, (1999).

Tibshirani, R., "Regression Shrinkage and Selection via the Lasso," *J. Royal Statistical Soc. B* 58(1): 267-288 (1996).

Varma, M. and Ray, D., "Learning the Discriminative Power-Invariance Trade-Off," In: *Proceedings of the IEEE International Conference on Computer Vision*, Rio de Janeiro, Brazil (2007).

von Ahn, L. and Dabbish, L., "Labeling Images with a Computer Game," In: *Proceedings of the ACM CHI* 6(1):319-326 (2004).

Wang, L., et al., "Automatic Image Annotation and Retrieval Using Subspace Clustering Algorithm," In: *ACM Int'l Workshop Multimedia Dadabases* 100-108 (2004).

Yang, C., et al., "Region-Based Image Annotation Using Asymmetrical Support Vector Machine-Based Multiple-Instance Learning," In: *Proceedings of the IEEE International Conference on Computer Vision and Pattern Recognition* (2006).

Yavlinsky, A., et al., "Automated Image Annotation Using Global Features and Robust Nonparametric Density Estimation," In: *International Conference on Image and Video Retrieval (CIVR)* 3568:507-517 (2005).

English-language translation of Chinese Office Action issued Nov. 28, 2011 in corresponding Chinese Application No. 200980129633. X., 17 Pages.

Korean Intellectual Property Office Notice of Office Action (w/English translation) for KR 10-2011-7000140 dated Sep. 2, 2013, 6 pages.

English-language translation of Office Action in Chinese Application No. 200980129633.X, issued Jun. 1, 2012, 4 pages.

Authorized officer Agnes Wittmann-Regis, International Preliminary Report on Patentability in PCT/US2009/040975, mailed Dec. 16, 2010, 6 pages.

Communication in EP Application No. 09 767 173.9, dated Oct. 22, 2012, 6 pages.

U.S. Appl. No. 13/799,307, filed Mar. 13, 2013, Annotating Images, Makadia.

CONTENT-BASED IMAGE RANKING

BACKGROUND

This specification relates to ranking search results for queries.

Conventional search engines identify resources such as web pages, images, text documents, and multimedia content, for example, as search results that are responsive to a user query and present the results to the user. Such search engines typically rank search results so that they are ordered by degree of relevance to the user query. The quality of the ranking can depend on the type, precision, and accuracy of data that is used to score the resources.

SUMMARY

This specification describes technologies relating to ranking search results for queries, particularly for ranking image search results.

In general, one aspect of the subject matter described in this specification can be embodied in methods that include the actions of calculating a visual similarity score for one or more pairs of images in a plurality of images based on visual features of images in each of the one or more pairs; building a graph of images by linking each of one or more images in the plurality of images to one or more nearest neighbor images based on the visual similarity scores of the image pairs that include the image; associating a respective score with each of one or more images in the graph based on data indicative of user behavior relative to the image as a search result for a query; and determining a new score for each of one or more images in the graph based on the respective score of the image, and the respective scores of one or more nearest neighbors to the image as weighted by their visual similarity to the image. Other embodiments of this aspect include corresponding systems, apparatus, and computer program products.

These and other embodiments can optionally include one or more of the following features. The method further includes ranking each of one or more images in the plurality of images according to the image's new score. The user behavior is selection of the image. Calculating a visual similarity score for one or more pairs of images includes extracting one or more features from visual content of a first image, and the method further includes identifying one or more k nearest neighbor images based on a distance measure between the first image and each of the one or more k nearest neighbor images. The distance measure is a combination of basic distances from multiple visual features. The distance measure is based on a joint equal contribution (JEC). A first image is connected by an edge to each of one or more k nearest neighbor images, and the edge is associated with a weight that represents the distance measure between the first image and a first nearest neighbor image.

The weight is calculated by passing the distance measure through a non-linear function. Determining the new score includes calculating the new score using a function that has a closed-form solution. Calculating the new score includes: normalizing the weights; and calculating $C=(1-\alpha)*(I-(\alpha*W))^{-1}*c$, where c is a vector representing the respective scores, C is a vector representing the new scores, W is a matrix representing the normalized weights, I is an identity matrix, and $\alpha$ is a determined parameter. Determining the new score includes: iteratively calculating the new score until convergence. Iteratively calculating the new score includes: normalizing the weights; and calculating $$c_{i,new} = \alpha * \sum_{j \neq i} (W_{ij} * c_{j,current}) + (1-\alpha) * c_{i,current},$$

where $c_{i,current}$ is a current score for the first image, $c_{j,current}$ is a current score for the first nearest neighbor image represented by node j, $c_{i,new}$ is the new score for the first image, $W_{ij}$ is the normalized weight that represents the distance measure between the first image represented by node i and the first nearest neighbor image represented by node j, and $\alpha$ is a determined parameter.

In general, another aspect of the subject matter described in this specification can be embodied in a computer readable medium for storing data that includes a graph of images, each of one or more nodes in the graph representing a different image from a plurality of images, one or more nodes linked to one or more nearest neighbor nodes based on a visual similarity between images represented by the linked nodes; where a new score is associated with each of one or more images in the graph based on a respective score of the image, and respective scores of one or more nearest neighbors to the image as weighted by their visual similarity to the image, and where the respective score of the image is based on data indicative of user behavior relative to the image as a search result for a query. Other embodiments of this aspect include corresponding systems, apparatus, and methods.

These and other embodiments can optionally include one or more of the following features. Linked nodes are connected by edges, where the edges are associated with weights that represent distance measures of the visual similarity between images represented by the linked nodes. The new scores are expressed as: $C=(1-\alpha)*(I-(\alpha*W))^{-1}*c$, where c is a vector representing the respective scores, C is a vector representing the new scores, W is a matrix representing normalized weights, I is an identity matrix, and $\alpha$ is a determined parameter. The new scores are expressed as:

$$c_{i,new} = \alpha * \sum_{j \neq i} (W_{ij} * c_{j,current}) + (1-\alpha) * c_{i,current},$$

where $c_{i,current}$ is a current score for the image, $c_{j,current}$ is a current score for a nearest neighbor image represented by nearest neighbor node j, $c_{i,new}$ is the new score for the image, $W_{ij}$ is a normalized weight that represents the distance measure between the image represented by node i and the nearest neighbor image represented by node j, and $\alpha$ is a determined parameter.

Particular embodiments of the subject matter described in this specification can be implemented to realize one or more of the following advantages. The systems and techniques for ranking a first resource based on content and data indicative of user behavior relative to the first resource and a second resource as a search result for a query are scalable to a large number of queries (e.g., millions of queries), thereby increasing the flexibility and coverage of a search. In addition, the systems and techniques described in this specification can be used for ranking resources that are not associated with data indicative of user behavior or do not have sufficient context (e.g., annotations) to provide an accurate score, thereby further increasing the flexibility and coverage of the search. For example, an amount of data available to score a particular resource is increased, thereby reducing effects of noise in a subset of data that was previously available to score the particular resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
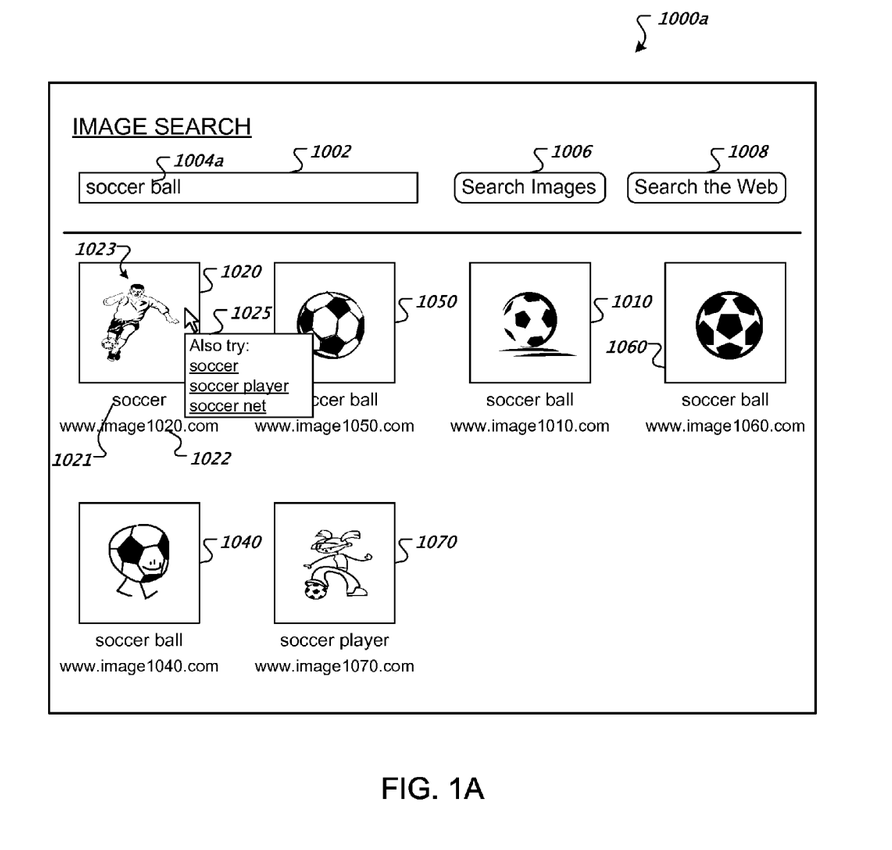
FIG. 1A illustrates an example web page including image search results displayed according to a first order.

FIG. 1A illustrates an example web page 1000a including image search results displayed according to a first order. The web page 1000a includes a query 1004a, "soccer ball," entered in a search text field 1002 and a group of image search results 1010, 1020, 1040, 1050, 1060, and 1070 returned from a search engine in response to the query 1004a. Each image search result for a particular image can include a label 1021 for the particular image from a resource, a selectable link 1022 to the resource, and a thumbnail image 1023 of the particular image. Typically, the thumbnail image 1023 can also be selected to access the resource. The web page 1000a can also include user interface elements for submitting queries for searches within an image corpus (e.g., "Search Images" button 1006) and for submitting queries for searches within a web page corpus (e.g., "Search the Web" button 1008).

The first order in which the image search results are displayed in FIG. 1A illustrates an example where the data used to score and rank images can be inaccurate. In particular, the data can be indicative of user behavior relative to an image being a search result for a query. In some implementations, the user behavior is selection of the image.

Each selection of a presented document reference such as an image, for example, is recorded as a "click" for the document in connection with the query. A timer can be used to track how long a user views or "dwells" on the document. For example, a longer time spent dwelling on a document (i.e., a long click) can indicate that a user found the document to be relevant for the query. A brief period viewing a document (i.e., a short click) can be interpreted as a lack of document relevance. In some implementations, the click data is a count of clicks of all types (e.g., long, medium, short) for a particular query and document combination. In some implementations, the click data includes a count of each click type (e.g., long, medium, short) for a particular query and document combination. Aggregated click data from queries for a given document can be used to rank or enhance a ranking of that document. By way of illustration, a quantity of result statistics can be a weighted average of the count of long clicks for a given document and query pair.

A search engine or other process creates a record in a model database for documents that are selected by users in response to a query. Each record within the model, e.g., a tuple <document, query, data>, is at least a combination of a query submitted by users, a document reference selected by users in response to that query, and an aggregation of click data for all users that select the document reference in response to the query. The aggregated click data is viewed as an indication of document relevance. In various implementations, model data is locale-specific (e.g., country, state, etc.) or language-specific. Other extensions of model data are possible.

The click data can be inaccurate due to "noise" that represents users selecting a first image that may interest the users, even though the first image may not be as relevant to the query as other images. In FIG. 1A, thumbnail image 1023 of image search result 1020 shows a soccer player, e.g., a world-renowned soccer player. Users searching for "soccer ball" may be distracted by an image of a popular soccer player and may select the image even though it is not relevant to their query or original search intent. Users may also spend a relatively long amount of time viewing the document such that a medium click or long click is recorded. As a result, the click data associated with the image may include a relatively high count of long clicks. Therefore, the score for the image of the soccer player may indicate that the image is more relevant to the query 1004a "soccer ball" than other images (e.g., images corresponding to image search results 1010, 1040, 1050, and 1060) which, in reality, may be more relevant to the query 1004a.

Figure 1B:
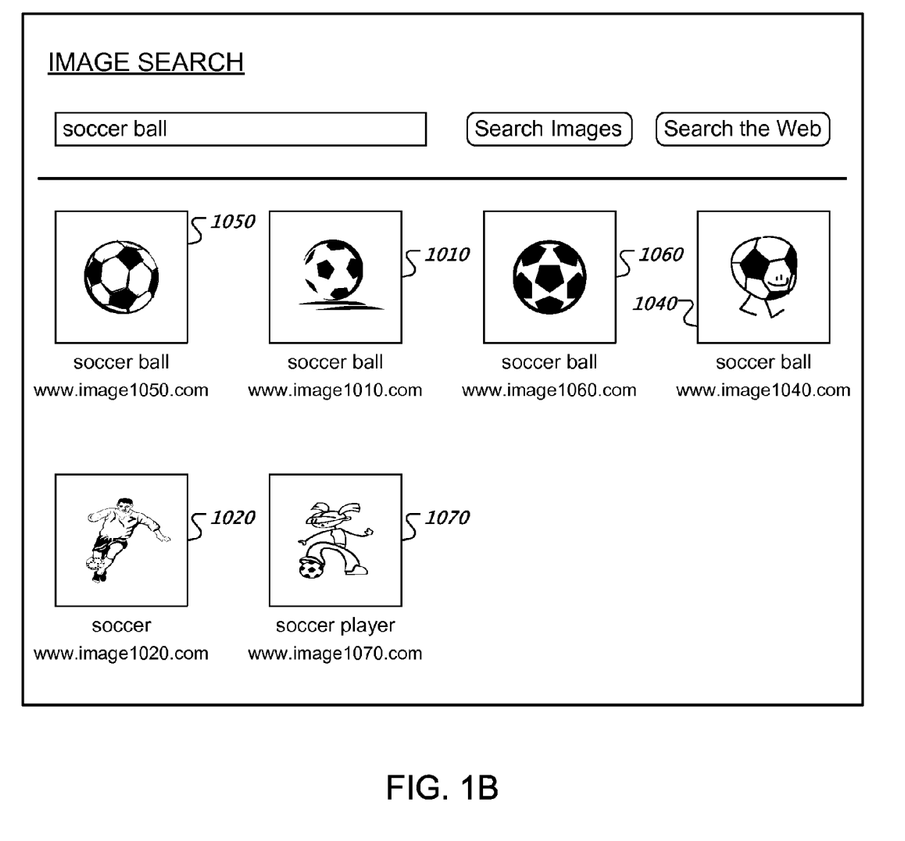
FIG. 1B illustrates the example web page of FIG. 1A including the image search results displayed according to a second order.

FIG. 1B illustrates the example web page 1000a of FIG. 1A including the image search results displayed according to a second order. The initial ranking of the image search results, as represented by the first order in FIG. 1A, are modified such that similar images are ranked closer to each other. In particular, the scores of the images can be generated based on data indicative of user behavior relative to one or more similar images as a search result for the query, as described below. In FIG. 1B, image search results 1020 and 1070, which both include images of soccer players, are ranked closer to each other.

Figure 2:
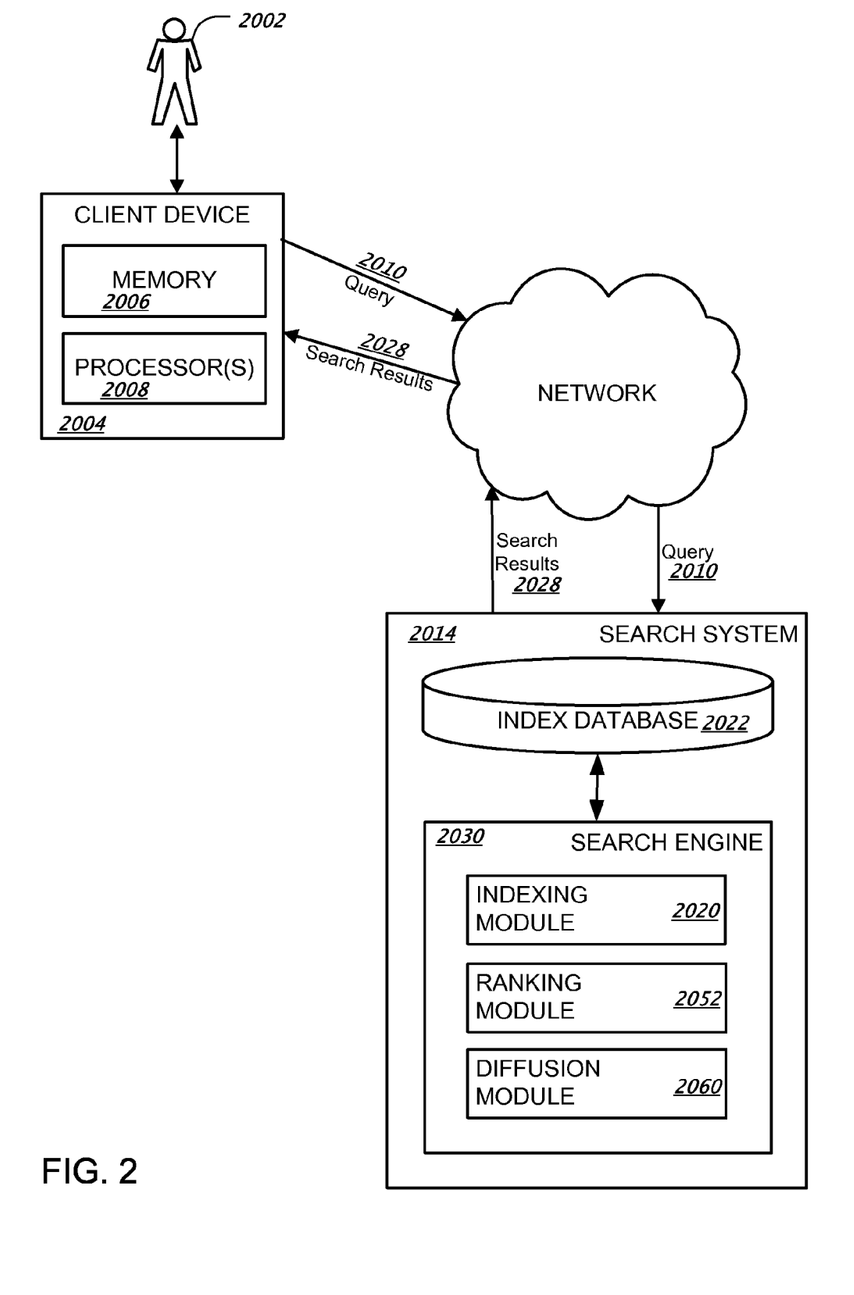
FIG. 2 includes an example search system.

FIG. 2 includes an example search system 2014, specifically for providing search results relevant to submitted search queries as can be implemented in the Internet, an intranet, or another client and server environment. The search system 2014 is an example of an information retrieval system in which the systems, components, and techniques described below can be implemented.

Users 2002 interact with the search system 2014 through a client device 2004, e.g., a personal computer, a mobile telephone, a personal digital assistant, a mobile audio or video player, a game console, or a combination of one or more of them. For example, the client 2004 can be a computer coupled to the search system 2014 through a local area network (LAN), e.g., an enterprise intranet, or a wide area network (WAN), e.g., the Internet. The client device 2004 will generally include a memory 2006, e.g., random access memory (RAM), and one or more processors 2008.

Users 2002 submit queries to a search engine 2030 within a search system 2014. Examples of queries include text-based queries, speech signals, touch screen gestures, non-touch gestures, motion gestures, image-based queries, or video-based queries. Each query 2010 is transmitted through one or more wired or wireless networks to the search system 2014. The search system 2014 can be implemented as, for example, computer programs running on one or more computers in one or more locations that are coupled to each other through a network. The search system 2014 includes an index database 2022 and a search engine 2030. The search system 2014 responds to the query 2010 by generating search results 2028, which are transmitted through the network to the client device 2004 in a form that can be presented to the user 2002, e.g., as a search results web page to be displayed in a web browser running on the client device 2004.

When the query 2010 is received by the search engine 2030, the search engine 2030 identifies relevant resources. The search engine 2030 will generally include an indexing module 2020 that actively searches a corpus of resources, e.g., web pages, images, blogs, databases, or news articles on an intranet or the Internet, to index the resources found in that corpus, and stores index information for the resources in an index database 2022. This index database 2022 is used to identify resources that match the query 2010.

The search engine 2030 will also generally include a ranking module 2052 (or other software) to rank the resources related to the user query 2010. In some implementations, ranking of the resources is performed using conventional techniques that determine an information retrieval score (also referred to as a "score") for indexed resources based on a given query. Other ranking techniques are possible. After the information retrieval score is determined, the information retrieval score is modified by a diffusion module 2060 as described below. For example, the diffusion module 2060 can generate a scaling weight, e.g., a multiplier, used to modify the information retrieval score to produce a final score. The search engine 2030 can transmit the search results 2028 through the network to the client device 2004 for presentation to the user 2002.

By way of illustration, the web page 1000a can be displayed in a browser on the client device 2004. The client device 2004 can transmit the query 1004a to the search system 2014. The search system 2014 can generate the image search results 1010, 1020, 1040, 1050, 1060, and 1070, in a manner as described with reference to FIGS. 3-5, and transmit the results to the client device 2004.

Figure 3:
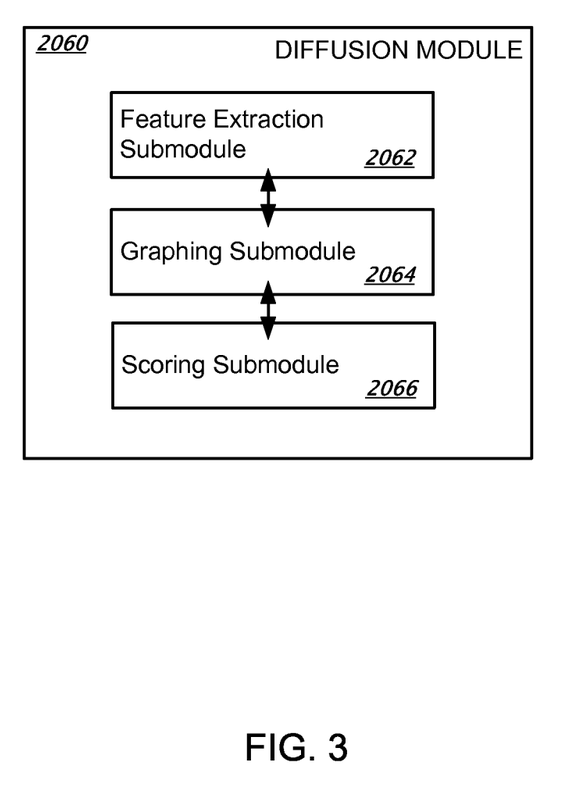
FIG. 3 shows an example diffusion module.

FIG. 3 shows an example diffusion module 2060. The diffusion module 2060 includes a feature extraction submodule 2062, graphing submodule 2064, and scoring submodule 2066. Other implementations are possible. For example, the graphing submodule 2064 could be a component separate from the diffusion module 2060, e.g., the search engine 2030 could include a distinct graphing module.

Furthermore, the components of the diffusion module 2060 can be communicatively coupled to one or more of each other. Though the components identified in the diffusion module 2060 are described as being logically separate or distinct, one or more of the components of the diffusion module 2060 may be combined or further divided.

The feature extraction submodule 2062 identifies features of images. The features can be local, global, or combinations thereof, and can include, for example, color (e.g., hue, saturation, and value), texture, or other graphical attributes of an image. In some implementations, the features are represented by vectors in a multi-dimensional feature space and a similarity or distance measure between a pair of vectors is represented by a distance between each feature vector. The distance measure can be a Euclidean distance or a non-Euclidean distance, e.g., L1 similarity measures, K-L divergence, and compositions of any general, basic distances from multiple features such as color, texture, and object features of each image. In some implementations, a k nearest neighbor (kNN) algorithm is used to identify k nearest neighbors for each image based on the identified features, where k is greater than or equal to zero and less than or equal to a total number of nodes in a graph. Other algorithms for determining nearest neighbors are possible. In addition, k can be different for each node. For example, k can equal 10 for a first node that represents a first image, and k can equal 2 for a second node that represents a second image.

The graphing submodule 2064 generates the graph based on the distance measures for the images. The graph includes nodes that represent each image and edges or links that connect the nodes based on the distance measure determined by the feature extraction submodule 2062.

The scoring submodule 2066 uses the graph to score the images. In some implementations, the scoring submodule 2066 diffuses information associated with each node to the node's k nearest neighbors using linear neighborhood weighting, as described in further detail below with respect to FIGS. 4-5. The scores can be provided to the ranking module 2052 in order to rank the images.

Figure 4:
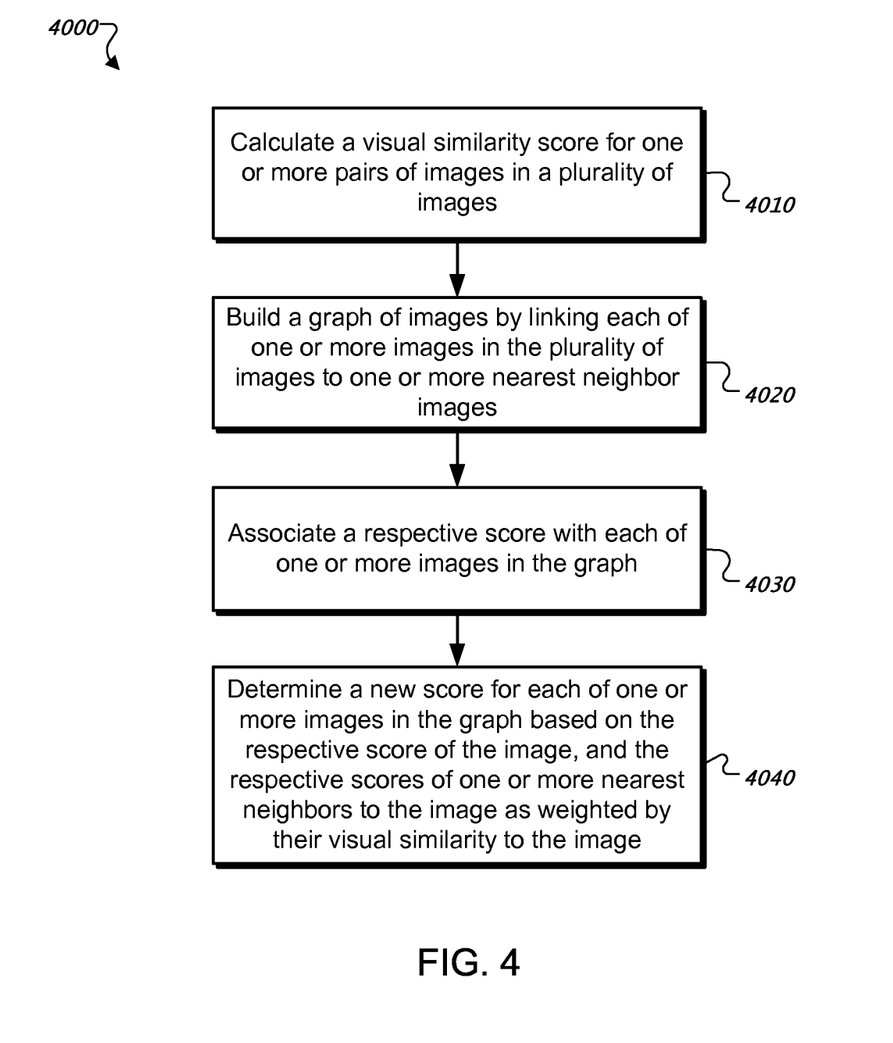
FIG. 4 shows an example process for scoring images based on visual content and data indicative of user behavior.

FIG. 4 shows an example process 4000 for scoring images based on visual content and data indicative of user behavior. The process 4000 includes calculating 4010 a visual similarity score for one or more pairs of images in a plurality of images based on visual features of images in each of the one or more pairs. For example, scoring submodule 2066 can calculate the visual similarity score. Feature extraction submodule 2062 extracts features from the images and identifies k nearest neighbors (e.g., k=10 for a first image, k=2 for a first image) of each image based on the extracted features. In some implementations, the features are features related to graphical attributes of the images. Other implementations are possible. For example, the features can be text-based image annotations or other context, such as a Uniform Resource Locator identifying the location of the image.

A nearest neighbor is defined based on a measure of similarity between the features of a pair of images. In some implementations, global features are extracted from a first image and a second image. A distance measure is calculated based on the extracted global features. For example, the distance measure can be derived as an average of the distances between the global features, and the average can be based on a substantially equal contribution from each distance between a global feature. In the example, the distance measure is referred to as a Joint Equal Contribution (JEC). Additional details regarding defining the distance measure using JEC can be found, for example, in Makadia et al., *A New Baseline for Image Annotation*, European Conference on Computer Vision 2008 (ECCV 2008), October 2008. Other implementations are possible. In some implementations, scale-invariant feature transform (SIFT) features of each image are detected and used for calculating distance measures between images.

The process 4000 also includes building 4020 a graph of images by linking each of one or more images in the plurality of images to one or more nearest neighbor images based on the visual similarity scores of the image pairs that include the image. In particular, distance measures between images in pairs of images are used to generate a graph that shows the visual similarity between the images.

Figure 5:
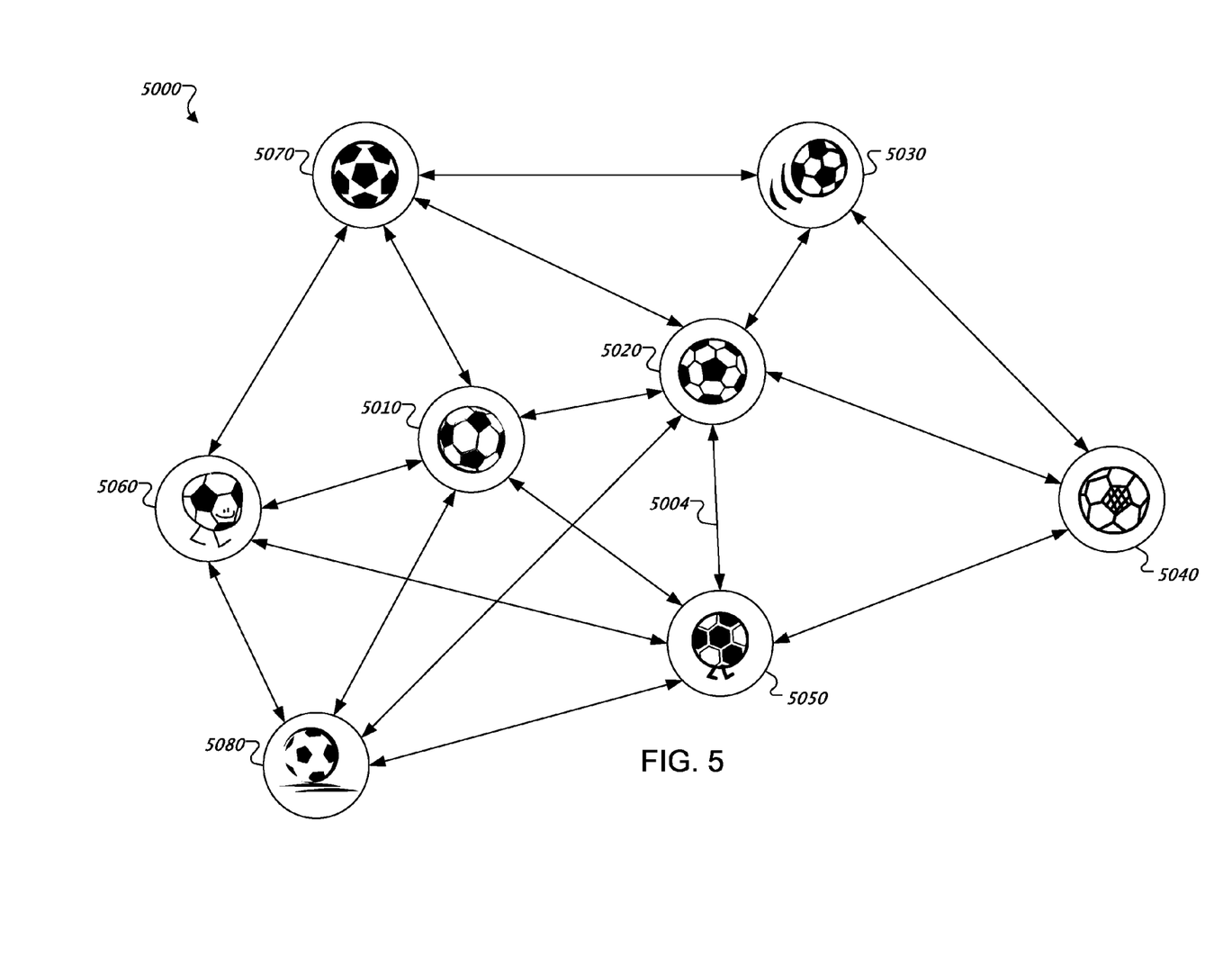
FIG. 5 illustrates an example graph that includes nodes representing images.

FIG. 5 illustrates an example graph 5000 that includes nodes (5010, 5020, 5030, 5040, 5050, 5060, 5070, and 5080) representing images. In FIG. 5, node 5020 is linked to nodes 5010, 5030, 5040, 5050, and 5070. In some implementations, the connection between linked nodes is related to a weight representing a similarity between the visual content of images represented by a pair of linked nodes. For example, the distance measure between a pair of linked nodes is further processed to produce a weight representing a similarity measure. In particular, the distance measure is passed through a linear or non-linear function, e.g., a Gaussian function, to produce the weight. The link is represented on the graph 5000 by an edge, e.g., edge 5004. The edge 5004 directly connects the node 5020 to node 5050. Other edges connect node 5020 to other nearest neighbor nodes. The edge is related with a weight that represents the similarity between a pair of linked nodes.

Other implementations are possible. In some implementations, the edges between nodes can have a single direction, or the edges can be bi-directional. As an example of bi-directional edges, if a node i is a neighbor of a node j, the graph includes an edge between node i and node j that indicates that node i is a neighbor of node j and that node j is a neighbor of node i. In the example, when the edges are bi-directional, one or more nodes in the graph can be connected with more than k nearest neighbors.

Returning to FIG. 4, the process 4000 includes associating a respective score with each of one or more images in the graph based on data indicative of user behavior relative to the image as a search result for a query. For example, scoring submodule 2066 calculates a respective score for each of the one or more images, based on conventional techniques, techniques described below, or combinations thereof.

The process 4000 also includes determining 4040 a new score for each of one or more images in the graph based on the respective score of the image, and the respective scores of one or more nearest neighbors to the image as weighted by their visual similarity to the image. Step 4040 is an example of a diffusion process.

In some implementations, the diffusion module 2060 receives a group of pre-ranked images, e.g., 1,000 or more images ranked by the ranking module 2052 as responsive to a particular query. The diffusion module 2052 modifies the ranking of the images as described below. In further implementations, the diffusion module 2060 can receive or obtain a group of unranked images. At least one image in the group of the unranked images has associated data, e.g., text annotation, click data, or other image metadata that can be used to score the image. For example, at least one image can have an associated click fraction, e.g., click data representing a relationship between a number of selections of a first received image as a search result for the query and aggregated click data related to the query. The diffusion module 2060 can "diffuse" the data associated with one or more images to other images in the group that may or may not have associated data that can be used to score each respective other image.

In the diffusion process, an initial score for each image is generated. For example, if an image does not have associated scoring data, its score is set to zero. In some implementations, images with associated scoring data are identified. The initial score for the images are modified based on the associated scoring data. For example, if an image has associated scoring data, its score is set to a non-zero value s (e.g., $0<s\le1$) based on its associated scoring data. Then, a final score for the image is generated based on a combination of the initial score for the image, and the initial scores for the images represented by the one or more nearest neighbor nodes weighted by their visual similarity to the image. Note that the initial score of each of the one or more nearest neighbor nodes are calculated based on its own nearest neighbor nodes. Therefore, as will be described in further detail below with respect to performing multiple iterations of the calculations until convergence of the final scores, the scores of each image can be based on initial scores for all the images in the graph.

Other implementations are possible. In some implementations, filtering is performed to identify scoring data that is not used during the diffusion process. Images with an associated score less than a threshold value are not used to generate the final score. A score that is less than the threshold value can be set to zero.

Temporarily referring to FIG. 5, nodes 5010, 5020, 5030, and 5070 each represent a different image with associated scoring data. In addition, node 5060 represents an image that is not associated with scoring data. The initial score for the image represented by node 5060 is set to zero, and the scores for the images represented by nodes 5010, 5020, 5030, and 5070 are calculated based on scoring data associated with each respective node. A final score is generated for the image associated with node 5070 based on a combination of the initial score for the image represented by node 5070, and the initial scores for the images represented by nodes 5010, 5020, 5030, and 5060.

In some implementations, the combining is performed using a linear combination of weighted, initial scores associated with the node and one or more of its nearest neighbors. For a given node, the weights that are related to each of the edges that connect the given node to its k nearest neighbors can be normalized such that the weights sum to one. For each edge that connects the given node to its nearest neighbors, the score of the nearest neighbor is modified (e.g., multiplied) by the weight. The sum of the modified scores associated with the nearest neighbors is combined with the score of the given node.

In some implementations, the combination is a convex combination. For example, the convex combination is expressed as:

$$c_{i,new} = \alpha * \sum_{j \ne i} (W_{ij} * c_{j,current}) + (1-\alpha) * c_{i,current},$$

where $c_{i,current}$ is a current score for an image represented by the given node, $c_{j,current}$ is a current score for an image represented by a nearest neighbor node j, $c_{i,new}$ is the intermediate score for the represented image, $W_{ij}$ is the normalized weight related to the correlation between the represented node i and the nearest neighbor node j, and α is a determined parameter, e.g., where $0<\alpha<1$.

This calculation is performed for each node in the graph by treating each node as the given node. In some implementations, the calculation is iterated for each node in the graph until convergence of the final scores. A closed-form equation can express the convergence solution as:

$$C = (1-\alpha) * (I - (\alpha * W))^{-1} * c,$$

c is a vector representing initial scores, C is a vector representing the final scores after convergence, W is a matrix representing the normalized weights, I is an identity matrix, and α is the determined parameter.

In some implementations, the vector C is used to rank the images. For example, diffusion module 2060 provides vector C to ranking module 2052. Ranking module 2052 ranks the images, for example, by sorting the scores in vector C in descending order. The image with the highest corresponding score would ideally be the most relevant image in the group of images returned for a query.

Other implementations are possible. For example, other types of linear combinations can be used to combine the scores. In particular, the weights can be normalized using parameters such as non-dimensional ratios of errors, residuals, means, or standard deviations. As another example, non-linear combinations can be used to combine the score.

Returning to the example in FIG. 5, the weights that are related to the edges that connect node 5070 to its nearest neighbor nodes 5010, 5020, 5030, and 5060 are normalized. Then, scoring data for each node connected to node 5070 is multiplied by a respective weight, i.e., the weight related to the edge that connects the node to node 5070, to produce modified scores for nodes 5010, 5020, 5030, and 5060. The score associated with the image represented by node 5070 and the modified scores associated with the images represented by nodes 5010, 5020, 5030, and 5060 are combined as described previously.

Other implementations are possible. For example, applications of the systems and techniques described previously are not limited to image searching. In some implementations, videos are scored and ranked according to the described techniques. In particular, nodes in a graph can represent videos. The weights related to the edges between the nodes that represent videos are based on a similarity measure between the represented videos.

In addition, use of the systems and techniques is not limited to scoring graphical media such as images and video. Text documents and audio can also be scored. Furthermore, the described systems and techniques can also be used for other applications, e.g., in machine translation, graph processing, and other content-based retrieval systems.

The techniques described previously can also be performed offline, during run-time, e.g., in real-time in response to receiving a query, or in combinations thereof. An example of performing the techniques offline includes generating the graph and scoring and ranking images based on a predetermined query before receipt of a particular query. The predetermined ranking is used when the particular query is received. An example of performing the techniques during run-time includes generating the graph and scoring the images after the query is received. Other implementations are possible. In some implementations, nodes and edges connecting nodes are generated offline, and scoring is performed during run-time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    calculating, using one or more processors, a visual similarity score for one or more pairs of images in a plurality of images based on visual features of images in each of the one or more pairs;
    building a graph of images by linking each of one or more images in the plurality of images to one or more nearest neighbor images based on the visual similarity scores of the image pairs that include the image;
    identifying respective historical click data for each of the images in the graph wherein the historical click data comprises a count of user selections of the image when the image was presented as a search result responsive to a query, and wherein a viewing time of the image after being selected exceeded a pre-determined threshold;
    associating a respective score with each of the images in the graph based on respective historical click data for the image; and
    determining a new score for each of one or more images in the graph based on the respective score of the image, and the respective scores of one or more nearest neighbors to the image as weighted by their visual similarity to the image.

2. The method of claim 1, further comprising:
    ranking each of one or more images in the plurality of images according to the image's new score.

3. The method of claim 1, where calculating a visual similarity score for one or more pairs of images includes extracting one or more features from visual content of a first image, and the method further comprises identifying one or more k nearest neighbor images based on a distance measure between the first image and each of the one or more k nearest neighbor images.

4. The method of claim 3, where the distance measure is a combination of basic distances from multiple visual features.

5. The method of claim 4, where the distance measure is based on a joint equal contribution (JEC).

6. The method of claim 1, where a first image is connected by an edge to each of one or more k nearest neighbor images, and the edge is associated with a weight that represents the distance measure between the first image and a first nearest neighbor image.

7. The method of claim 6, where the weight is calculated by passing the distance measure through a linear or non-linear function.

8. The method of claim 6, where determining the new score includes:
    calculating the new score using a function that has a closed-form solution.

9. The method of claim 8, where calculating the new score includes:
    normalizing the weights; and
    calculating $C=(1-\alpha)*(I-(\alpha*W))^{-1}*c$, where c is a vector representing the respective scores, C is a vector representing the new scores, W is a matrix representing the normalized weights, I is an identity matrix, and $\alpha$ is a determined parameter.

10. The method of claim 7, where determining the new score includes:
    iteratively calculating the new score until convergence.

11. The method of claim 10, where iteratively calculating the new score includes:
    normalizing the weights; and
    calculating $$c_{i,new} = \alpha * \sum_{j \neq i} (W_{ij} * c_{j,current}) + (1-\alpha) * c_{i,current},$$

where $c_{i,current}$ is a current score for the first image, $c_{j,current}$ is a current score for the first nearest neighbor image represented by node j, $c_{i,new}$ is the new score for the first image, $W_{ij}$ is the normalized weight that represents the distance measure between the first image represented by node i and the first nearest neighbor image represented by node j, and $\alpha$ is a determined parameter.

12. A non-transitory computer readable medium encoded with a computer program operable to cause one or more processors to perform operations comprising:

calculating a visual similarity score for one or more pairs of images in a plurality of images based on visual features of images in each of the one or more pairs;

building a graph of images by linking each of one or more images in the plurality of images to one or more nearest neighbor images based on the visual similarity scores of the image pairs that include the image;

identifying respective historical click data for each of the images in the graph wherein the historical click data comprises a count of user selections of the image when the image was presented as a search result responsive to a query, and wherein a viewing time of the image after being selected exceeded a pre-determined threshold;

associating a respective score with each of the images in the graph based on respective historical click data for the image; and determining a new score for each of one or more images in the graph based on the respective score of the image, and the respective scores of one or more nearest neighbors to the image as weighted by their visual similarity to the image.

13. The program product of claim 12, further operable to cause one or more processors to perform operations including:

ranking each of one or more images in the plurality of images according to the image's new score.

14. The program product of claim 12, where calculating a visual similarity score for one or more pairs of images includes extracting one or more features from visual content of a first image, and where the program product is further operable to cause one or more processors to perform operations including identifying one or more k nearest neighbor images based on a distance measure between the first image and each of the one or more k nearest neighbor images.

15. The program product of claim 14, where the distance measure is a combination of basic distances from multiple visual features.

16. The program product of claim 15, where the distance measure is based on a joint equal contribution (JEC).

17. The program product of claim 12, where a first image is connected by an edge to each of one or more k nearest neighbor images, and the edge is associated with a weight that represents the distance measure between the first image and a first nearest neighbor image.

18. The program product of claim 17, where the weight is calculated by passing the distance measure through a linear or non-linear function.

19. The program product of claim 17, where determining the new score includes:

calculating the new score using a function that has a closed-form solution.

20. The program product of claim 19, where calculating the new score includes:

normalizing the weights; and calculating $C=(1-\alpha)*(I-(\alpha*W))^{-1}*c$, where c is a vector representing the respective scores, C is a vector representing the new scores, W is a matrix representing the normalized weights, I is an identity matrix, and $\alpha$ is a determined parameter.

21. The program product of claim 17, where determining the new score includes:

iteratively calculating the new score until convergence.

22. The program product of claim 21, where iteratively calculating the new score includes:

normalizing the weights; and calculating $$c_{i,new} = \alpha * \sum_{j \neq i} (W_{ij} * c_{j,current}) + (1-\alpha) * c_{i,current},$$

where $c_{i,current}$ is a current score for the first image, $c_{j,current}$ is a current score for the first nearest neighbor image represented by node j, $c_{i,new}$ is the new score for the first image, $W_{ij}$ is the normalized weight that represents the distance measure between the first image represented by node i and the first nearest neighbor image represented by node j, and $\alpha$ is a determined parameter.

23. A system comprising: a machine-readable storage device including a program product; and one or more computers operable to execute the program product, interact with a display device, and perform operations comprising:

calculating a visual similarity score for one or more pairs of images in a plurality of images based on visual features of images in each of the one or more pairs;

building a graph of images by linking each of one or more images in the plurality of images to one or more nearest neighbor images based on the visual similarity scores of the image pairs that include the image;

identifying respective historical click data for each of the images in the graph wherein the historical click data comprises a count of user selections of the image when the image was presented as a search result responsive to a query, and wherein a viewing time of the image after being selected exceeded a pre-determined threshold;

associating a respective score with each of the images in the graph based on respective historical click data for the image; and determining a new score for each of one or more images in the graph based on the respective score of the image, and the respective scores of one or more nearest neighbors to the image as weighted by their visual similarity to the image.

* * * * *

UNITED STATES PATENT AND TRADEMARK OFFICE
CERTIFICATE OF CORRECTION

| | | |
|---|---|---|
| PATENT NO. | : 8,781,231 B1 | Page 1 of 1 |
| APPLICATION NO. | : 12/547303 | |
| DATED | : July 15, 2014 | |
| INVENTOR(S) | : Kumar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this
Fifth Day of April, 2016

Michelle K. Lee
*Director of the United States Patent and Trademark Office*